United States Patent [19]

Lindner

[11] 4,140,974

[45] Feb. 20, 1979

[54] DISTORTION CORRECTOR FOR THE ADAPTIVE BASE BAND CORRECTION OF A PHASE-MODULATED SIGNAL

[75] Inventor: Robert Lindner, Munich, Fed. Rep. of Germany

[73] Assignee: Siemens Aktiengesellschaft, Munich, Fed. Rep. of Germany

[21] Appl. No.: 789,574

[22] Filed: Apr. 21, 1977

[30] Foreign Application Priority Data

Apr. 30, 1976 [DE] Fed. Rep. of Germany ....... 2619392

[51] Int. Cl.$^2$ .......................................... H04L 27/22
[52] U.S. Cl. ..................................... 325/320; 178/67
[58] Field of Search ............... 325/320, 346, 373, 374, 325/418, 419, 421, 422; 340/347 DD; 178/67, 69.1, 88, 66 R; 320/134; 333/18

[56] References Cited

U.S. PATENT DOCUMENTS

| 4,047,153 | 9/1977 | Thirion | 325/320 |
| 4,057,759 | 11/1977 | Genova et al. | 325/320 |

Primary Examiner—Benedict V. Safourek
Attorney, Agent, or Firm—Schuyler, Birch, Swindler, McKie & Beckett

[57] ABSTRACT

Apparatus is described for adaptively correcting distortion in phase modulation signals following demodulation. Binary signals indicating the position of a signal vector of the demodulated signal for each modulation period are formed, and from this an indication of the error angle of that vector is obtained. A corresponding fault signal controls adjustment of the demodulated signal applied to a decoder to provide for distortion correction.

2 Claims, 8 Drawing Figures

DISTORTION CORRECTOR FOR THE ADAPTIVE BASE BAND CORRECTION OF A PHASE-MODULATED SIGNAL

BACKGROUND OF THE INVENTION

The invention relates to a distortion correcting apparatus for the adaptive correction of a phase-modulated signal, more particularly the invention is directed to a device which will make such corrections following coherent demodulation.

It is known to provide adaptive correction to signals of the type here in question before demodulation. However, correction at this stage in situations where items of data are transmitted at varying rates is, at best, difficult since correcting devices which operate prior to demodulation are analog devices. The latter type of correcting device cannot be readily accommodated to varying data transmission speeds.

An object of the invention is to provide an adaptive correcting device for phase-modulated signals for correction of such signals following demodulation and for providing the capability to carry out such corrections with data signals transmitted at varying rates.

A further object of the invention is to provide an adaptive correcting device of the type described hereinabove which fulfills the above object and reduces angular errors occurring during correction ensuring rapid and accurate correction for distortions.

SUMMARY OF THE INVENTION

The foregoing and other objects are attained in an adaptive correcting device for phase-modulation signals operating according to a technique wherein a coherent demodulator produces from the phase-modulated signal two orthogonally related signals defining a vector. The sectors in which the vector can appear are each assigned a multi-digit binary number and are represented by sector signals.

For each bit of the binary numbers, a shift register is provided whose delay elements are connected to one another in each case via a main terminal corresponding to the main terminals of filters forming a part of the correction device and via a plurality of subsidiary terminals corresponding to the subsidiary terminals of the filters.

The sector signals are fed to the shift registers, where the sector signals present at the main terminals represent a main terminal binary number, where the sector signals present at the subsidiary terminals each represent a subsidiary terminal binary number, and where difference signals are formed which signal the differences of subsidiary terminal binary number minus main terminal binary number.

The difference signals are fed to code converters which convert code words of the dual code into code words of the gray code.

The output signals of the code converters are fed, in the form of sine and cosine signals, to correlators.

A fault stage receives the sector signals which represent binary numbers and two corrected signals, from which the fault signal is formed, and this signals the angular error which the relevant signal vector exhibits.

Since the correcter in accordance with the invention is suitable for correcting signals after demodulation, it can be used to advantage in all cases in which items of data are transmitted at possibly different speeds across the transmission link. The correcter in accordance with the invention can be operated in digital fashion so that by changing a few pulse train frequencies it can be set at various data transmission speeds in simple fashion.

A further advantage of the corrector in accordance with the invention consists in that it substantially reduces angular errors, as a result of which a rapid and accurate compensation of the distortions is ensured.

If the correcter is to be constructed in integrated fashion, it is advantageous to provide for each shift register and for each subsidiary terminal, subtracter stage which is connected to the main terminals of the shift registers and to the subsidiary terminals of the shift registers, and which emits the difference signals via its outputs.

If the correcter is to be constructed in non-integrated fashion and, at the same time, with relatively little expense, it is advantageous to provide a first pulse generator which produces a first timing signal whose period duration is equal to one modulation section, and which, during a first and second duration within the modulation section assumes a first and second binary value, respectively. A series of switches are provided, each of which possess a break contact and two make contacts, of which the break contacts are connected to the first delay elements of the shift registers, of which the first and second make contacts, during the first and second durations of the first timing signal, cause the sector signals to be fed to the first delay elements of the shift registers and connect the outputs of the last delay elements of the shift registers, respectively, to the first delay elements. A second pulse generator produces shift pulses during the modulation sections for the operation of the shift registers. A third pulse generator produces a third timing signal consisting of a rectangular pulse which occurs during the first duration of the first timing signal. A bistable trigger stage is provided whose inputs are connected to the main terminals of each of the shift registers. The control inputs of the shift registers receive the third timing signal from the third pulse generator, and, on the occurrence of the rectangular pulse of the third timing signal the sector signals which have been delayed and appear at the input. The sector signals are then emitted from corresponding outputs of the shift register. A subtracter stage is connected to the outputs of the trigger stages and to the first delay elements of the shift registers, and the difference signals are emitted via the subtracter outputs.

BRIEF DESCRIPTION OF THE DRAWINGS

In the following, exemplary embodiments of the invention will be described making reference to FIGS. 1 to 8, where identical components appearing in more than one figure have been provided with like references.

DETAILED DESCRIPTION OF PREFERRED EMBODIMENTS

Figure 1:
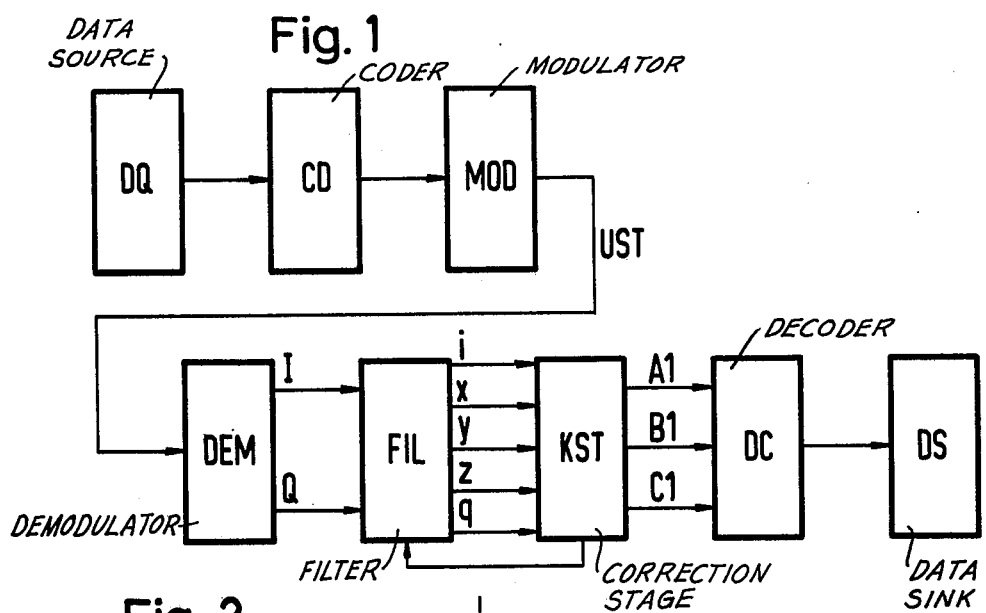
FIG. 1 is a block-schematic diagram of a preferred embodiment of a system according to the invention for the transmission of data using phase-modulated signals.

FIG. 1 illustrates, at the transmitting end, a data source DQ, a code CD, a transmitter and modulator MOD. These are conventional components, and any of the well known devices for performing their prescribed functions can be used. The data source DQ emits a sequence of individual bits which are referenced 0 and 1. In coder CD, individual bit groups are assigned phases of a carrier; for example, the three-member bit groups 000, 001, 010, 011 ... can be assigned phases of a carrier. Consecutive three-member bit groups are thus indicated by phase differences, the phase differences relating either to a fixed reference phase or to the particular preceding phase. The coder CD feeds the transmitter and modulator MOD with a signal which indicates the individual bit groups and the corresponding phase differences, and a carrier is phase-modulated with this signal. The phase-modulated signal is transmitted across the transmission link UST.

Arranged at the receiving end are a conventional phase demodulator DEM, filters FIL, correction stage KST, decoder DC and data sink DS. The demodulator DEM coherently demodulates the received, phase-modulated signal and supplies two signals I, Q which are orthogonal to one another to an adaptive correcter which comprises filters FIL and correction stage KST. In the course of the correction process, the corrected signals i and q are obtained which can be considered as cmponents of a signal vector VS.

Figure 2:
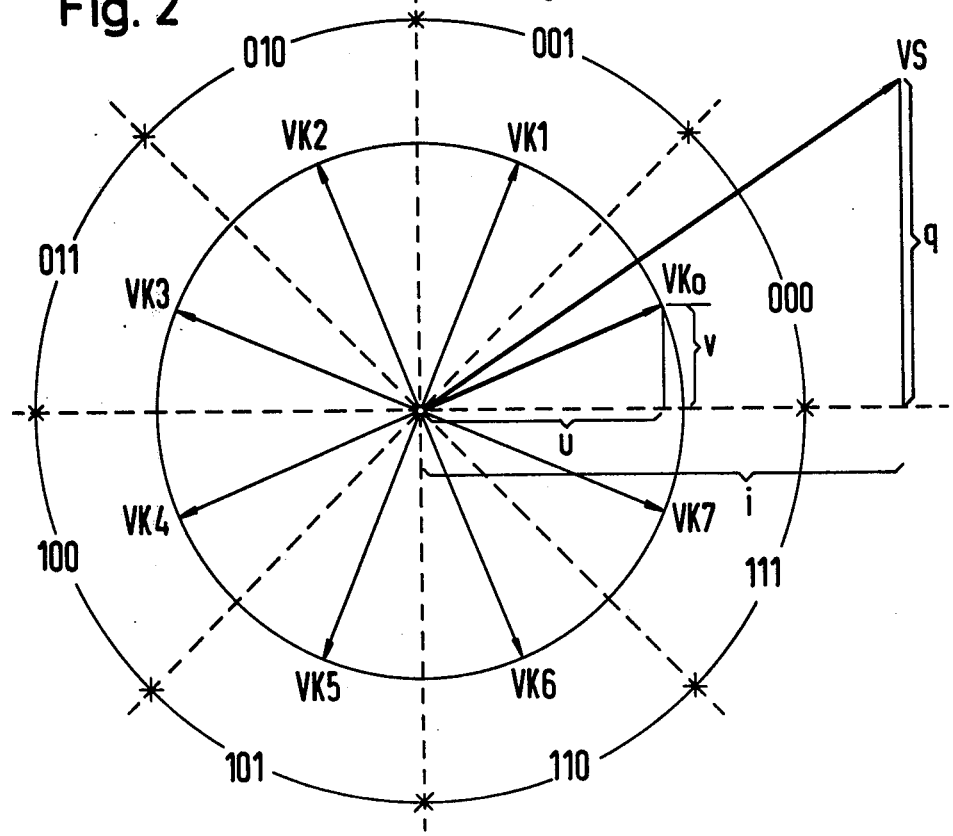
FIG. 2 is a vector diagram in explanation of individual signal vectors.

FIG. 2 illustrates a signal vector VS having components i and q. The FIG. 2 diagram shows a total of eight sectors 000, 001, 010, 011, 100, 101, 110, 111. Each signal vector VS lies in one of the illustrated sectors. In particular, the illustrated signal vector VS lies in the sector 000. Correction stage KST illustrated in FIG. 1 and a decision stage (FIG. 3), in dependence upon the signal vector VS, establish that sector in which the particular signal vector lies, and these sectors are indicated with the sector signals A1, B1, C1. In the illustrated case, the sector signals A1, B1, C1 are equal to the word 000. The sectors 000 to 111 can also be characterized by the sector vectors VK0, VK1, VK2, VK3, VK4, VK5, VK6, VK7. In accordance with FIG. 2, the sector 000 is assigned the sector vector VK0 with the components u and v.

The decoder DC illustrated in FIG. 1 receives, with the second signals A1, B1, C1, the information as to the sector in which the signal vector VS of a given modulation section lies. From the sequence of two consecutive sectors, the decoder DC again determines the three-member bit groups which in accordance with FIG. 1 have been applied to the coder CD from the data source DQ. These three-member bit groups are fed to the data sink DS. The data source DQ and data sink DS can be in the form of punched card read-out devices or high-speed printers, or the like.

Figure 3:
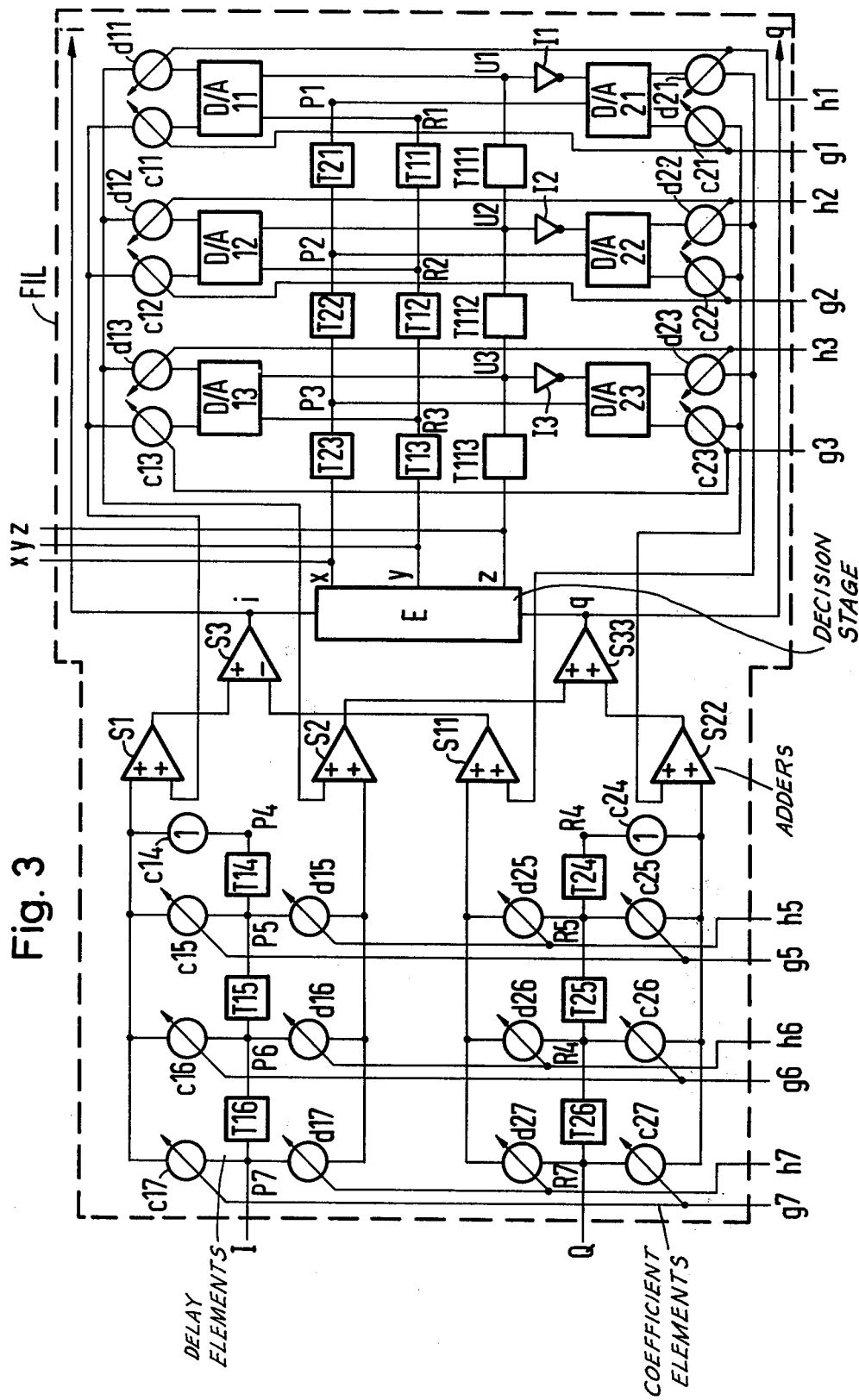
FIG. 3 is a detailed schematic diagram of filters for processing two orthogonal signals as produced by a demodulator in the FIG. 1 embodiment.

FIG. 3 gives a more detailed view of the filters FIL which are schematically illustrated in FIG. 1 and which are parts of an adaptive correcter according to the invention. One of the two filters is formed by the delay elements T11, T12, T13, T14, T15, T16, T111, T112, T113, by the coefficient elements c11, c12, c13, c14, c15, c16, c17, d11, d12, d13, d15, d16, d17, by digital-analog converters D/A11, D/A12, D/A13, and by the adding circuits S1, S2, S3. The other filter is formed by the delay elements T21, T22, T23, T24, T25, T26, T111, T112, T113, by the coefficient elements d21, d22, d23, d25, d26, d27, c21, c22, c23, c24, c25, c26, c27, by digital-analog converters D/A21, D/A22, D/A23, by inverters I1, I2, I3 and by the adding circuits S11, S22, S33.

The coefficient elements each possess one regulating input marked by an arrow, with the exception of the coefficient elements c14 and c24. These coefficient elements are conventional devices used to change the attenuation or amplification in dependence upon regulating signals which are fed to the regulating signal inputs. Two regulating signal inputs are in each case connected together at one circuit point g1, h1, g2, h2, g3, h3, g5, h5, g6, h6, g7, h7 via which regulating signals are supplied. The coefficient elements c14 and c24 cannot be regulated and possess an amplification factor of 1.

The inputs of the adders are marked with plus and minus signs in order to characterize the operations which are carried out with the adders. The corrected signal i is emitted from the output of the adder S3, and the corrected signal q is emitted from the output of the adder S33. The corrected signals i and q are, as already mentioned, the components of the signal vector VS illustrated in FIG. 2. Using decision stage E, a conventional logic network, the sector 000 to 111 is determined in which the relevant signal vector VS lies. The established sector is indicated by the sector signals x, y, z, but in a different representation also by the sector signals A7, B7, C7 entered in FIG. 4 and by the sector signals A1, B1, C1.

| x | y | z | A7 | B7 | C7 | |
|---|---|---|----|----|----|-----|
| 0 | 0 | 0 | 0  | 0  | 0  | VK0 |
| 0 | 0 | 1 | 0  | 0  | 1  | VK1 |
| 0 | 1 | 1 | 0  | 1  | 0  | VK2 |
| 0 | 1 | 0 | 0  | 1  | 1  | VK3 |
| 1 | 1 | 0 | 1  | 0  | 0  | VK4 |
| 1 | 1 | 1 | 1  | 0  | 1  | VK5 |
| 1 | 0 | 1 | 1  | 1  | 0  | VK6 |
| 1 | 0 | 0 | 1  | 1  | 1  | VK7 |

Figure 4:
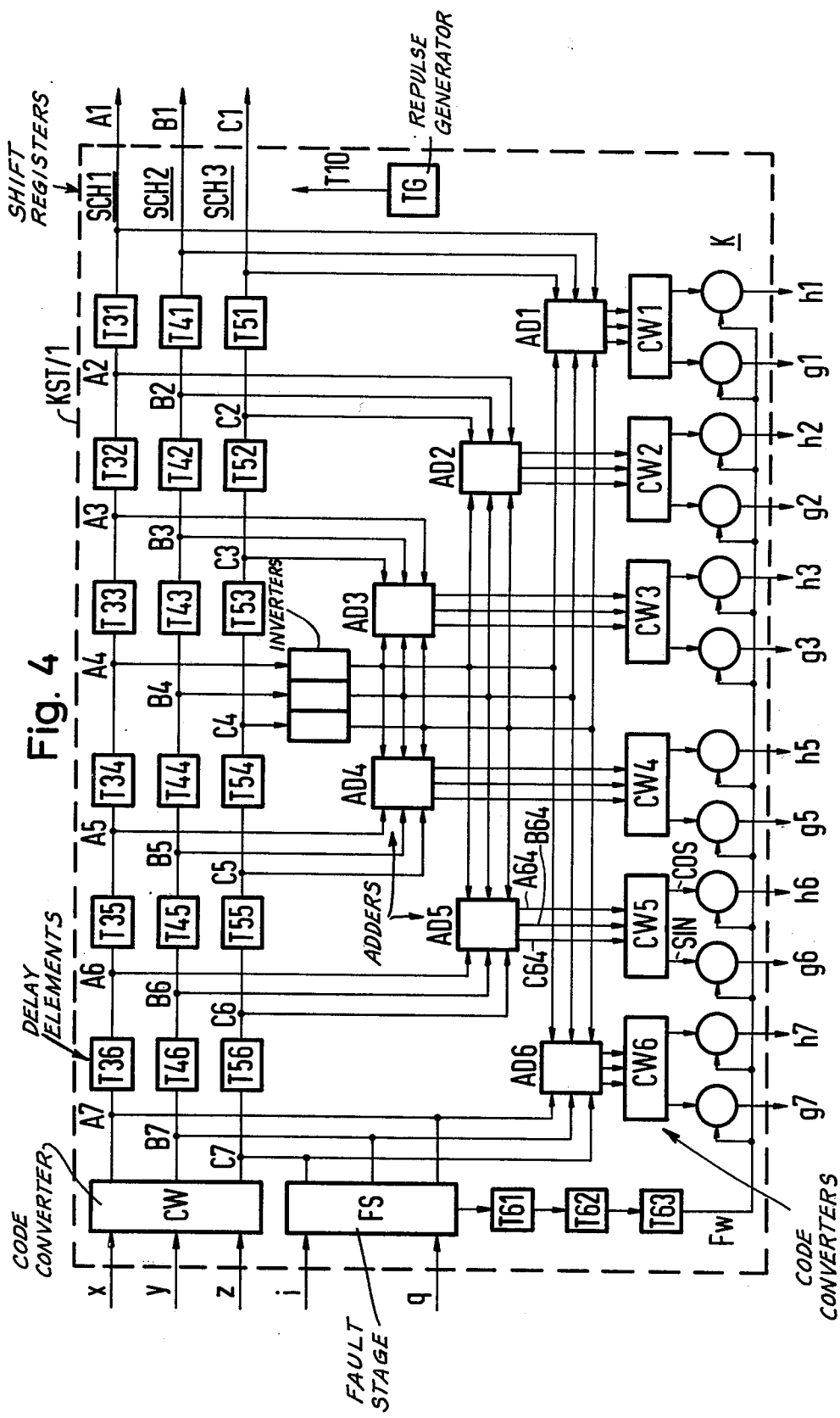
FIG. 4 is a detailed schematic diagram of a first preferred embodiment of a correction stage in the FIG. 1 embodiment.

FIG. 4 is a more detailed view of the correction stage KST/1, which is a first of two preferred embodiments of the correction stage KST schematically illustrated in FIG. 1. The schematically illustrated code converter CW is fed at its input with the sector signals x, y, z and emits the sector signals A7, B7, C7. The mode of operation of the code converter CW can be seen from Table 1, which also indicates the assignment of the sector signals to the sector vectors VK0 to VK7.

The outputs of the code converter CW are connected to shift register SCH1 formed by delay elements T31 to T36, shift register SCH2 formed by delay elements T41 to T46 and shift register SCH3 formed by delay elements T51 to T56. The delay elements illustrated in FIG. 3 and FIG. 4 effect a delay T which is equal to one modulation section. Modulation section T refers to that portion of the modulated carrier transmitted across the transmission link which is assigned a special bit group and a special phase. The main terminals P4 and R4 in FIG. 3 correspond to main terminals A4, B4, C4, in the FIG. 4 shift registers. Similarly, the subsidiary terminals P1, R1, U1 and P2, R2, U2, and P3, R3, U3 and P5, R5 and P6, R6, and P7, R7 illustrated in FIG. 3 correspond, respectively, to the subsidiary terminals A1, B1, C1, and A2, B2, C2 and A3, B3, C3 and A5, B5, C5 and A6, B6, C6 and A7, B7, C7 illustrated in FIG. 4. Pulse generator TG produces timing pulses T10 and are fed to all the delay elements T31 to T36, T41 to T46, T51 to T56. Each of these delay elements produce a delay of the duration T.

The three inverters IN, together with the adders AD1, AD2, AD3, AD4, AD5, AD6, form subtracter stages from which difference signals are obtained for indicating the differences in binary numbers which are governed by the signals received from the main terminals and subsidiary terminals of the shift registers. If the latter signals are provided with the same references as the main terminals and subsidiary terminals at which they occur, then, for example, using the adder AD5 and the three inverters IN the difference A6, B6, C6 - A4, B4, C4 is formed. Carries may also be taken into consideration in this difference formation. The sector signals A7, B7, C7 and A6, B6, C6 and A5, B5, C5 and A4, B4, C4 and A3, B3, C3 and A2, B2, C2 and A1, B1, C1 thus represent dual numbers. The sector signals A4, B4, C4 which occur at the main terminals A4, B4, C4 and bear like references represent a main terminal binary number. The sector signals of the subsidiary terminals represent corresponding subsidiary terminal binary numbers. The difference signals are formed by forming the difference of the subsidiary terminal binary numbers minus the main terminal binary numbers. Difference signals of this type are emitted from, respectively, all the adders AD1, AD2, AD3, AD4, AD5, AD6 to the corresponding code converters CW1, CW2, CW3, CW4, CW6.

Table 2 illustrates the mode of operation of the code converter CW5, which is fed at its input with the difference signals A64, B64, C64 and which emits the signals SIN and COS via the two outputs. The other code converters CW1, CW2, CW3, CW4, CW6 operate in the same way and thus bring about a code conversion from the dual code into the Gray code. In each case only two bits of the Gray code words are used.

| Dual | | | Gray | |
|---|---|---|---|---|
| A64 | B64 | C64 | SIN | COS |
| 0 | 0 | 0 | 0 | 1 |
| 0 | 0 | 1 | 0 | 0 |
| 0 | 1 | 0 | 0 | 1 |
| 0 | 1 | 1 | 0 | 1 |
| 1 | 0 | 0 | 1 | 1 |
| 1 | 0 | 1 | 1 | 0 |
| 1 | 1 | 0 | 1 | 0 |
| 1 | 1 | 1 | 1 | 1 |

The correlators K are connected by their inputs, respectively, to the code converters CW1 to CW6, are fed with the fault signal Fw and via their outputs emit correlator signals which are used to regulate the coefficient elements illustrated in FIG. 3.

The fault stage FS receives the signals $i$ and $q$ in order to characterize the signal vectors VS, and it receives the sector signals A7, B7, C7 to characterize that sector in which the relevant signal vector lies and to characterize that sector vector which comes closest to the signal vector. Angle error Fw is determined in fault stage FS and is delayed by the delay elements T61, T62, T63 by a total of three modulation periods T.

Figure 5:
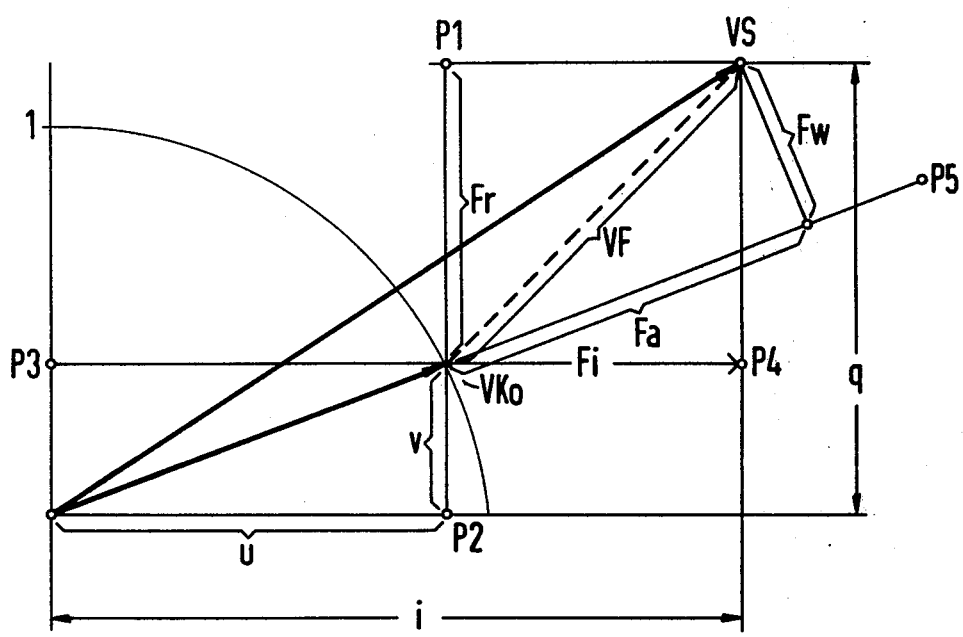
FIG. 5 is a diagram in explanation of fault definitions.

FIG. 5 shows a diagram in explanation of a plurality of fault definitions. The signals $i$ and $q$ emitted from the outputs of the adders S3 and S33 illustrated in FIG. 3 are the components of the signal vector VS illustrated in FIG. 5. Using the decision stage E illustrated in FIG. 3, the sector vector which lies closest to the signal vector VS is determined. In accordance with FIG. 5, this is the sector vector VK0 with the u and v. A standardized representation of this sector vector VK0 has been used so that it has a value of 1. The fault vector VF shown in broken lines can be fundamentally characterized by the in-phase signal error Fi, the orthogonal signal error Fr, the angle error Fw and the amplitude error Fa. These terms are governed by the following equations:

$$Fi = i - u$$

$$Fr = q - v$$

$$Fw = qu - iv$$

$$Fa = qv + iu - 1$$

If the signal vector Vs lies on the connection line P1, P2, the inphase signal error is Fi=0, whereas if the signal vector VS lies on the line P3, y4, the orthogonal signal error is Fr=0, and whereas the signal vector VS lies on the circle of unit radius, the amplitude error is Fa=0 although in all three cases an angle deviation of the signal vector Vs from the sector vector VK0 occurs. Therefore, it is advantageous to use the angle error Fw in estimating the error, because only the latter characterizes the correct assignment of the signal vector VS to the associated sector vector. Even when the signal vector VS is directed, for example, to the point P5, the angle error Fw=0 signals the correct sector vector VK0 although the in-phase signal error Fi, the orthogonal signal error Fr and the amplitude error Fa differ considerably from 0. The adaptive correcter which has been described with reference to FIGS. 3 and 4 is thus characterized by the fact that it determines the particular occurring angle error Fw, by which means a rapid and accurate compensation of the distortions is ensured.

Figure 6:
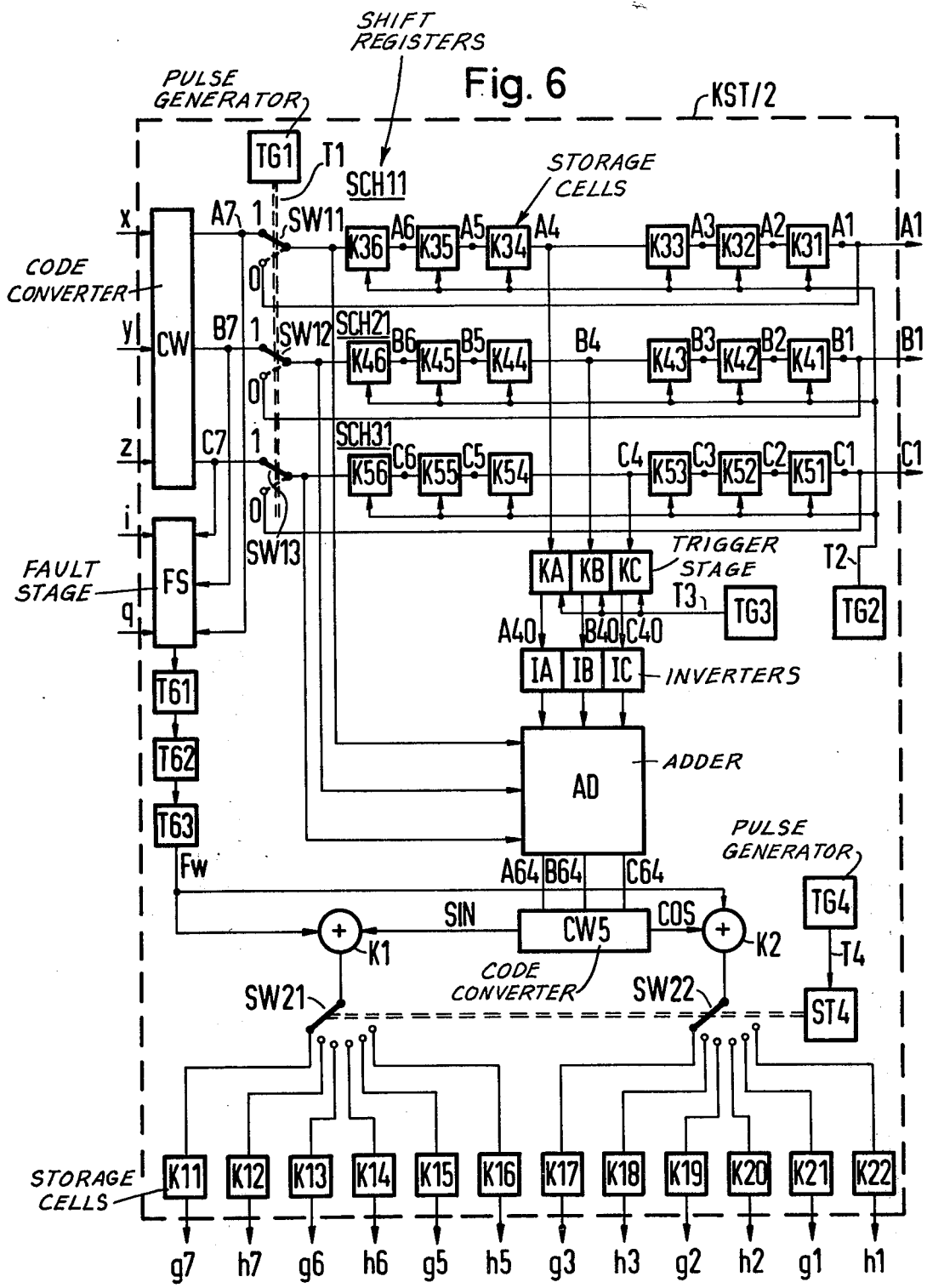
FIG. 6 is a detailed schematic diagram of a second preferred embodiment of a correction stage in the FIG. 1 embodiment.

FIG. 6 shows the correction stage KST/2, which is the second of two preferred embodiments of the correction stage KST schematically illustrated in FIG. 1. At its input the code converter CW is fed with the signals x, y and z, and operates in accordance with Table 1. The switches SW11, SW12, SW13 are controlled by the timing signal T1 of the pulse generator TG1. When the timing signal T1 assumes the binary values 0 and 1, the switches SW11, SW12, SW13 occupy the positions 0 and 1, respectively. The central contacts of these switches are connected to the shift registers SCH11, SCH21, SCH31 which are formed from the storage cells K31 to K36, K41 to K46, K51 to K56. The main terminals A4, B4, C4 again correspond to the main terminals P4, R4 shown in FIG. 3. The subsidiary terminals A1, B1, C1 and A2, B2, C2 and A3, B3, C3 and A5, B5, C5 and A6, B6, C6 and A7, B7, C7 again correspond to the subsidiary terminals illustrated in FIG. 3. The shift registers SCH11, SCH21, SCH31 are controlled by the element pulses of the timing signal T2.

The main terminals A4, B4, C4 are each connected to a trigger stage KA, KB, KC which receive the items of information at times which are dependent upon the timing signal T3. The items of information stored in these trigger stages are then available, as signals A40, B40 and C40 for a specific length of time at the inputs of the inverters IA, IB and IC, respectively. The outputs of these inverters are connected to the adder AD which forms a subtracter stage with the corresponding inverters and emits the difference signals A64, B64, C64 to the code converter CW5. Code converter CW5 in the conventional manner derives signals SIN, COS from the difference signals, and they are emitted therefrom to correlators K1, K2 where they are correlated with the fault signal Fw. The correlated signals are fed to the central contacts of the switches SW21 and SW22. Pulse generator TG4 produces timing signal T4 which controls the switches SW21, SW22. The contacts of these switches are connected to trigger stages K11 to K22 which serve to store the correlator signals and via whose outputs the regulating signals for the regulation of the coefficient elements illustrated in FIG. 2 are emitted.

Figure 7:
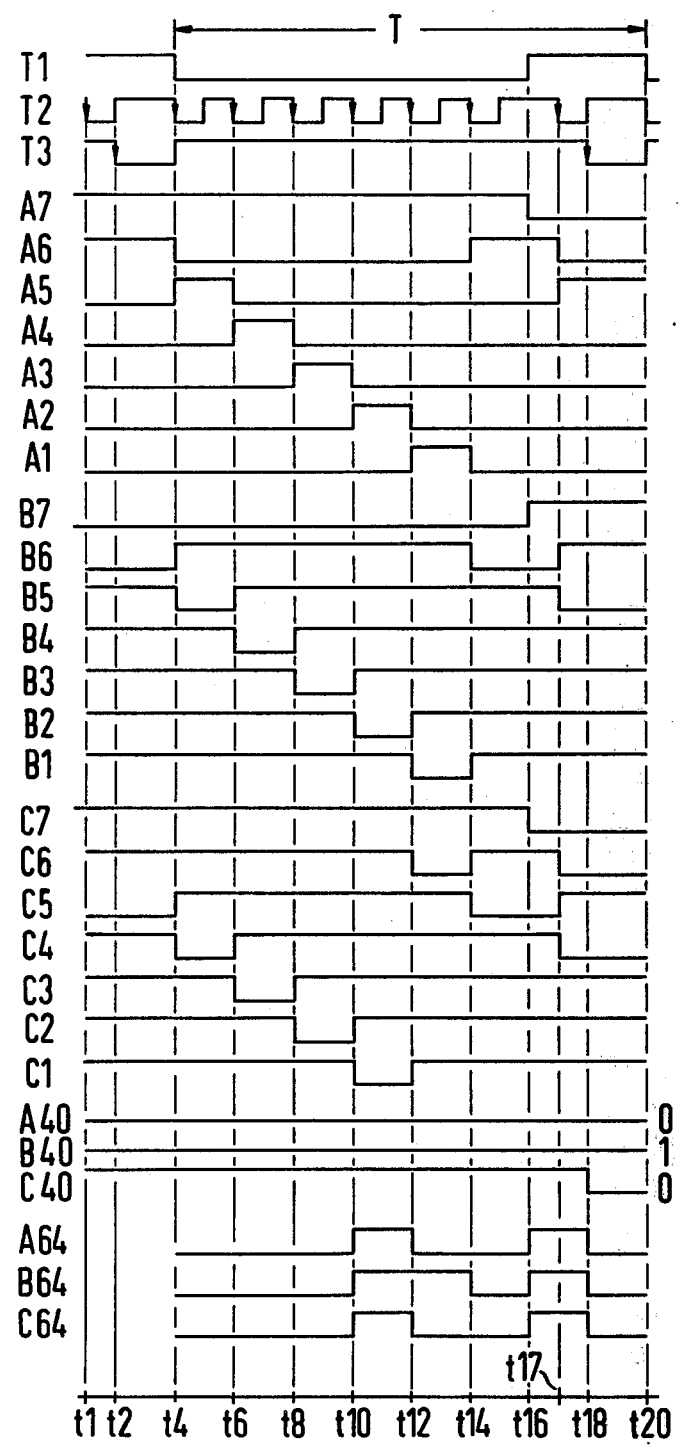
FIG. 7 is a time-waveform diagram illustrating the mode of operation of the correction stage shown in FIG. 6.

In the following mode of operation of the correction stage illustrated in FIG. 6 will be explained making reference to the diagrams in FIG. 7 where the abscissa axis relates to the time t. At the time t2, in coincidence with the negative edge of the timing signal T3, the signals A4, B4, C4 are transferred into the trigger stages KA, KB, KC so that the signals A40, B40, C40 can be obtained from their outputs. Since it is not until the time t18 that the signals A4, B4, C4 are transferred into the trigger stages KA, KB, KC again, the binary values of the signals A40, B40, C40 remain constant from the time t2 until the time t18.

It will be assumed that before the time t1 the illustrated sector signals A7, B7, C7 are emitted from the code converter CW. At the time t1, in coincidence with the negative edge of the signal T2, the sector signals A7, B7, C7 are transferred into the trigger stages K36, K46, K56 so that the signals A6, B6, C6 are formed. At the times t4, t6, t8, t10, t12, t14, further shift pulses of the timing signal T2 are fed to the trigger stages of the shift registers SCH11, SCH21, SCH31 producing the time-delayed signals A5 to A1, B5 to B1, C5 to C1. The adder AD is connected to the output signals of the inverters IA, IB, IC and to the sector signals A1, B1, C1, because at the time t4, under the control of the timing signal T1 the switches SW11, SW12, SW13 have been brought into their O-switching position. Using the inverters IA, IB, IC and the adder AD the differences in the binary numbers which are represented by the signals A40, B40, C40 and by the signals A1, B1, C1 are constantly formed. Carries are also taken into account in the determination of these differences, and in this way the difference signals A64, B64, C64 are produced. Between the times t4 and t6 the difference 011 − 011 = 000 is determined, for example, by the inverters IA, IB, IC and the adder AD. From the time t10 the difference 010 − 011 = 111 is determined. Carries are taken into account in this difference determination, for which reason it will not be discussed in detail. The inverters IA, IB, IC form the ones complement 111−011:

$$-011 = 111 - 011 - 111$$

With 111 − 011 = 100 and − 111 = −1000 + 001, we have:

$$-011 = 111 - 011 - 111 = 100 - 1000 + 001$$

For this difference we have $$010 - 011 = 010 + 100 - 1000 + 001 = 111 = 1000$$

The number 001 is permanently placed in the adder AD as input carry. The number 1000 reduces the result to the number range of 0 to 7 if a carry occurs in the fourth position. The fundamental 3 bits of the subtraction are thus 111. The same result could also have been achieved in FIG. 2, if one commenced from the sector 010 and took into consideration that the subtrahend −011 corresponds to the decimal number 3 and requires a rotation in the negative direction and in clock-wise direction by three sectors. Thus if one commences from the sector 010, in the negative direction one obtains firstly the sector 001, then the sector 000 and, as third sector, the desired sector 111.

From the time t12 to the time t14 the difference 101 − 011 = 010 is obtained. If, in accordance with FIG. 2, one again commences from the sector 101, the third sector in the negative direction is the desired sector 010.

At the time t16 the switches SW11, SW12, SW13 again assume their 1 switching positions so that with that shift pulse of the signal T2 which occurs at this time, the outputs of the code converter CW are again connected to the trigger stages K36, K46, K56, by which means the signals present at the outputs are transferred at the time t17. Then the signals which were transferred to the trigger stages K36k K46k K56 are advanced again, as already described.

The code converter CW5 produces a code conversion of the dual code words governed by the signals A64, B64, C64 into Gray code words corresponding to Table 2. However, the entire Gray code words are not required, but only the first two digits which are represented by the signals SIN and COS. In the pulse train of the signal T4, the correlator signals emitted from the correlators K1 and K2 are transferred via the switches SW21 and SW22 into the trigger stages K11 to K16 and K17 to K22 where they remain stored until the next modulation section T.

Figure 8:
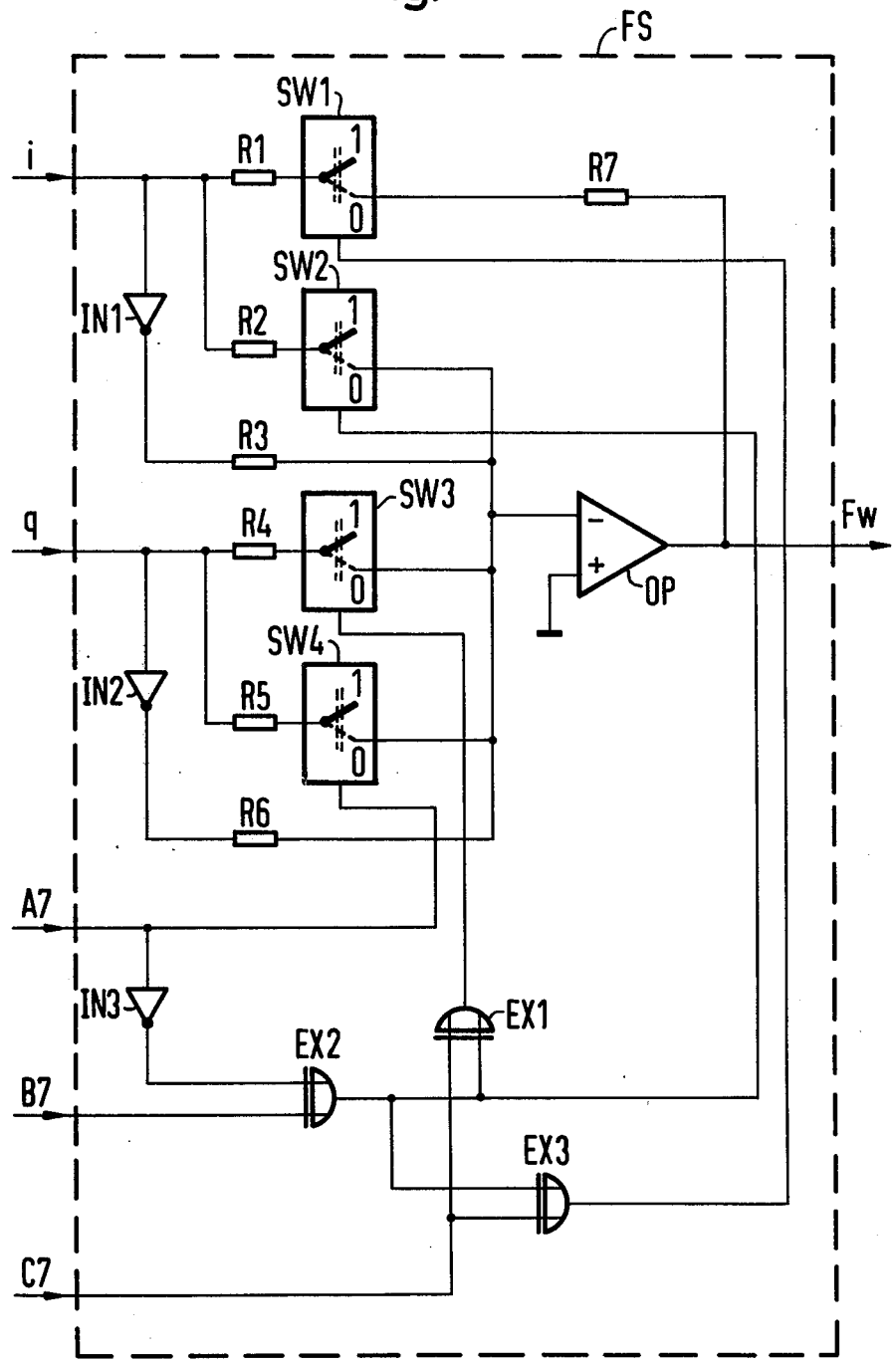
FIG. 8 is a detailed schematic diagram of a preferred embodiment of a fault stage forming part of the FIGS. 4 and 6 embodiments.

FIG. 8 illustrates in greater detail an exemplary embodiment of the fault stage FS schematically illustrated in FIGS. 4 and 6. This fault stage comprises inverters IN1, IN2, IN3, resistors R1, R2, R3, R4, R5, R6, R7, switches SW1, SW2, SW3, SW4, operational amplifier OP and EXCLUSIVE-OR gates EX1, EX2, EX3. The switches SW1 to SW4 can each assume two switch positions, of which the solid line switch positions are referenced 1 and the broken line switch positions are referenced 0. These switches SW1 to SW4 are controlled in turn by the output signals of the gate EX3 and the gate EX2, and the gate EX1 and by the signal A7; here the switches SW1 to SW4 assume their 0− and 1− switch position whenever the controlling signals assume a 0− and 1− binary value, respectively. From the output of the operational amplifier OP is emitted the signal Fw which, as already mentioned, represents the angle error.

In the description of the exemplary embodiments making reference to FIGS. 1 to 7 it has been assumed that the data source DQ illustrated in FIG. 1 emits groups of three-bits and that the decoder DC forwards groups of three-bits to the data sink DS. On the basis of these three-bit groups, sector signals have been produced which, in accordance with FIG. 2, signal a total of $2^3 = 8$ sectors 000 to 111. If, in general, groups each comprising n bits are emitted from the data source DQ and are fed via the decoder DC to the data sink DS, a total of $2^n$ sectors are signaled with sector signals.

Making reference to FIGS. 4 and 6, it has been explained that a code cnversion is carried out by the code converters CW. It would be basically conceivable for the decision stage E illustrated in FIG. 3 to emit the signals A7, B7, C7 instead of signals x, y, z, so that the code converters CW illustrated in FIGS. 4 and 6 would be dispensible.

The invention is described hereinabove by describing the construction and principles of operation of preferred embodiments constructed and arranged accordingly. It is contemplated that the described embodiments can be modified or changed in ways known to those skilled in the art while remaining within the scope of the invention as defined by the appended claims.

I claim:

1. Apparatus for adaptively correcting a received phase-modulated signal comprising:

demodulator means for coherently demodulating the received phase-modulated signal and for producing therefrom two orthogonally related demodulated signals, filter means for receiving said demodulated signals and for producing therefrom corrected signals representing signal vectors for each modulation period, said filter means including means for forming from said corrected signals multi-digit binary sector signals having values indicating sectors in which said signal vectors lie and means for regulating the values of said binary sector signals responsive to correction signals, correction stage means comprising a fault stage for receiving said binary sector signals and said corrected signals for producing fault signals indicating the error angles of said binary sector signals, a number of shift registers equal to the number of digits in said binary sector signals, each said shift register comprising a plurality of series-connected bistable stages, input terminals to the first of said bistable stages in said series connections being connected to receive, respectively, the digits of said binary sector signals and a plurality of subtracting means, each connected to receive, respectively, outputs from corresponding ones of said bistable stages in each of said registers and corresponding outputs from differing others of said bistable stages for forming difference signals, code converter means for converting said difference signals from a first digital binary code to a second digital binary code and for producing therefrom corresponding output signals and correlator means for receiving said fault signals and said code converter output signals for producing regulating signals for controlling said means for regulating.

2. The apparatus defined in claim 1 wherein said correction stage comprises:

a first pulse generator for producing a first timing signal having a period of a duration equal to one modulation section of said phase modulated signal and which, during first and second portions of a modulation section assumes first and second binary values, a plurality of switches, each having a break contact and two make contacts, a fault stage for receiving said binary sector signals and said corrected signals for producing fault signals indicating the error angles of said binary sector signals, a number of shift registers equal to the number of digits in said multi-digit binary sector signals, each said shift register comprising a plurality of series-connected bistable stages, the first of said bistable stages in each series connection having an input terminal, said break contacts of said switches being connected, respectively, to said input terminals of said shift registers, said switches being operated between first and second make contacts by said first timing signal during said first and second portions, said switches connecting said binary sector signals to said shift register input terminals during said first portion and connecting said input terminals to output terminals of said shift registers during said second portions, a second pulse generator for supplying a second timing signal forming shift pulses to said shift registers during the modulation sections, a third pulse generator for producing a third timing signal comprising a pulse occurring during said first portion of said first timing signal, additional bistable stages, one for each shift register, each having an input connected to a corresponding bistable stage of the shift register and a control input connected to said third pulse generator said additional bistable stages storing the delay binary sector signals present at their inputs upon the occurrence of the pulses of said third timing signal and wherein said subtracting means having inputs connected to outputs of said additional bistable stages and said shift register input terminals.

* * * * *